United States Patent
Sanma et al.

(10) Patent No.: US 8,412,390 B2
(45) Date of Patent: Apr. 2, 2013

(54) INFORMATION PRESENTATION DEVICE

(75) Inventors: Norio Sanma, Okazaki (JP); Keiji Shigeoka, Okazaki (JP); Sei Iguchi, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 345 days.

(21) Appl. No.: 12/805,568

(22) Filed: Aug. 5, 2010

(65) Prior Publication Data
US 2011/0035100 A1   Feb. 10, 2011

(30) Foreign Application Priority Data

Aug. 6, 2009   (JP) ................. 2009-183671

(51) Int. Cl.
*B60Q 1/42* (2006.01)
(52) U.S. Cl. .............. 701/9; 340/471; 340/429
(58) Field of Classification Search ......... 701/9, 41; 340/129, 429, 471, 491, 566, 825.36
See application file for complete search history.

(56) References Cited

U.S. PATENT DOCUMENTS

2008/0174415 A1* 7/2008 Tanida et al. ................. 340/438
2009/0043441 A1* 2/2009 Breed ............................ 701/29

FOREIGN PATENT DOCUMENTS

| JP | A-10-044895 | 2/1998 |
| JP | A-2005-280436 | 10/2005 |
| JP | A-2006-44563 | 2/2006 |
| JP | A-2007-55561 | 3/2007 |
| JP | A-2008-77631 | 4/2008 |
| JP | A-2009-31946 | 2/2009 |
| JP | A-2009-115553 | 5/2009 |
| JP | A-2010-18204 | 1/2010 |

OTHER PUBLICATIONS

Office Action mailed Nov. 8, 2011 in corresponding JP Application No. 2009-183671 (and English translation).

* cited by examiner

*Primary Examiner* — Mary Cheung
*Assistant Examiner* — Yuen Wong
(74) *Attorney, Agent, or Firm* — Posz Law Group, PLC

(57) ABSTRACT

An information presentation device includes: a directional information obtaining element for obtaining directional information based on a signal from an enhancement device for safety or comfort of a passenger of a vehicle; an information presentation controller for generating a driving signal based on the directional information; and a stimulation element including multiple vibrators for generating a traveling wave of vibration in an in-vehicle element. A directionality of the traveling wave corresponds to the directional information. The stimulation element transmits the traveling wave to the passenger so that the passenger perceives the directionality of the traveling wave.

13 Claims, 4 Drawing Sheets

INFORMATION PRESENTATION DEVICE

CROSS REFERENCE TO RELATED APPLICATION

This application is based on Japanese Patent Application No. 2009-183671 filed on Aug. 6, 2009, the disclosure of which is incorporated herein by reference.

FIELD OF THE INVENTION

The present invention relates to an information presentation device for informing a user intuitively.

BACKGROUND OF THE INVENTION

Conventionally, an information presentation device is well known, for example, in JP-A-2007-55561. In the device, a vibration generating unit such as a motor with an eccentric weight is mounted on a part of a steering wheel, which is gripped by a driver of a vehicle when the vehicle runs in a straight line. The transmit device transmits the information by controlling a magnitude (i.e., a strength) of vibration and a time interval (or duration time) of vibration.

Another information presentation device for a vehicle is well known in JP-A-2008-77631. In the device, a vibrator is mounted on an acceleration pedal, another vibrator is mounted on a steering wheel, and multiple vibrators are mounted on a seat of the vehicle. Then, the vibrators function with each other so that apparent movement occurs. Thus, the transmit device informs the information.

Here, the apparent movement is phenomenon such that, when two or more stimulations are applied on different positions continuously at short time intervals, as if one stimulation is applied and displaced from one position to another position. Accordingly, two or more vibrators contact the driver or are arranged near the driver at the same time, and the vibrators have a certain positional relationship so that vibration from two or more vibrators is applied to the driver at the same time.

In view of the above techniques in JP-A-2008-77631 and JP-A-2007-55561, when the information is transmitted to the driver via the steering wheel, the information may not be transmitted since the grip position of the driver is changed in order to operate the steering wheel.

Specifically, only when multiple vibrators (i.e., vibration generators) contact the driver at the same time, the information having a directional property can be transmitted to the driver. Thus, if the driver grips a part of the steering wheel, at which the vibrator is not arranged, the information may not be transmitted to the driver.

SUMMARY OF THE INVENTION

In view of the above-described problem, it is an object of the present disclosure to provide a information presentation device for informing a user intuitively.

According to an aspect of the present disclosure, an information presentation device includes: a directional information obtaining element for obtaining directional information based on a signal from an enhancement device, wherein the enhancement device enhances safety or comfort of a passenger of a vehicle, and at least a part of the enhancement device is disposed in the vehicle; an information presentation controller for generating a driving signal based on the directional information; and a stimulation element including a plurality of vibrators, each of which is operated based on the driving signal so that the vibrator generates a traveling wave of vibration in an in-vehicle element, wherein the passenger touches the in-vehicle element. A directionality of the traveling wave corresponds to the directional information, and the stimulation element transmits the traveling wave to the passenger so that the passenger perceives the directionality of the traveling wave.

The above device transmits the information about the safety or comfort when the passenger perceives the directionality of the traveling wave. Thus, the device prompts caution and driving operation, or transmits situation of equipment in the vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

An information presentation device for informing a user intuitively according to a first embodiment will be explained. Suitably, the transmit device is mounted on a vehicle such as an air plane, an automotive vehicle and other vehicles. Alternatively, the transmit device may be mounted on a game machine for controlling a vehicle in a game. The transmit device informs a user or a driver of the vehicle intuitively of driving support information such as approach information of a dangerous object. Specifically, when the driver concentrates on the driving of the vehicle, the transmit device effectively informs the driver. The information presentation device transmits the information having directionality to the user properly even if the user contacts a part of an in-vehicle device, at which no vibrator is arranged. The in-vehicle device such as a steering wheel provides a medium for conducting the information.

The information presentation device according to a first embodiment will be explained with reference to FIGS. 1 to 4. The steering wheel functions as an in-vehicle device for providing the medium of transmission of the information. The information presentation device informs the user of information having directionality with using perception phenomenon such as apparent movement and Phantom sensation.

The information is transmitted to the driver via a medium such as a steering wheel. When the driver grips a part of the steering wheel, the part as a grip portion is vibrated with a traveling wave.

Figure 1:
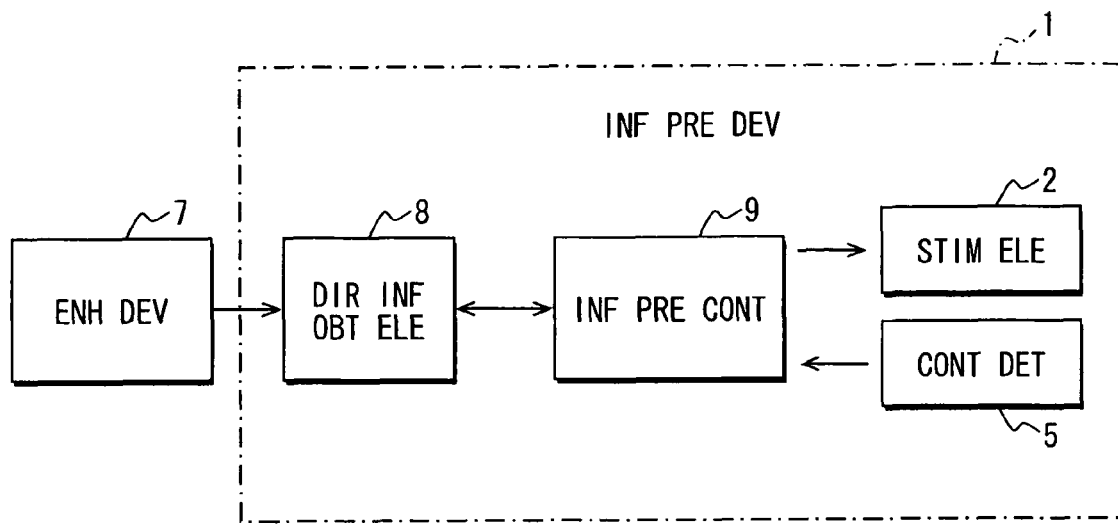
FIG. 1 is a block diagram showing a information presentation device according to a first embodiment.
Figure 2:
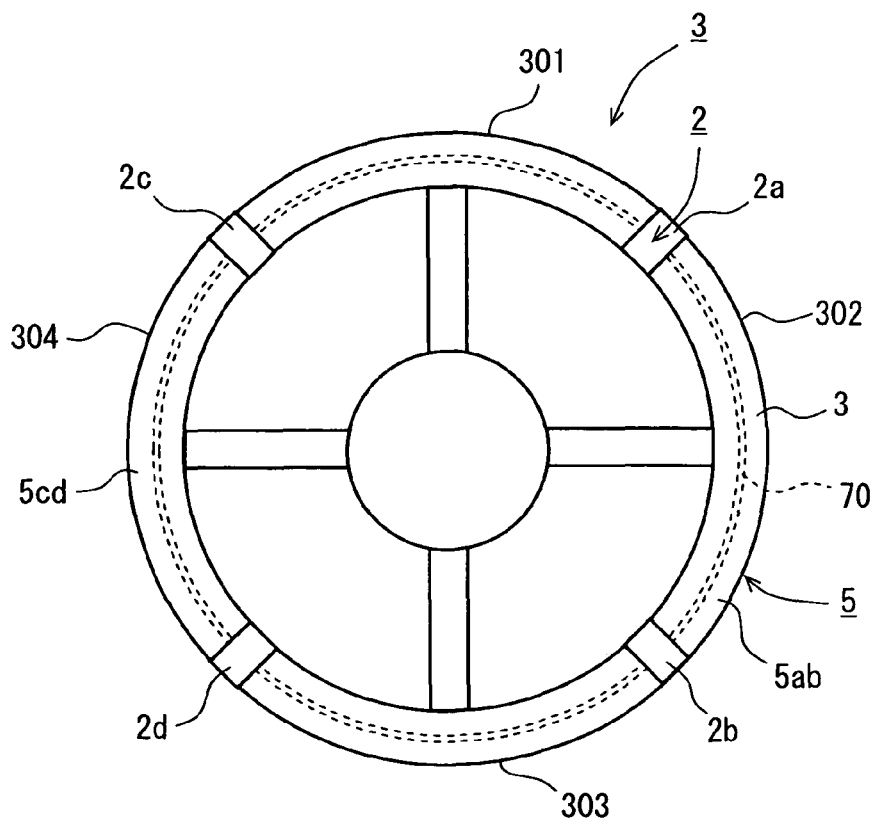
FIG. 2 is a diagram showing a steering wheel as an in-vehicle device.
Figure 3:
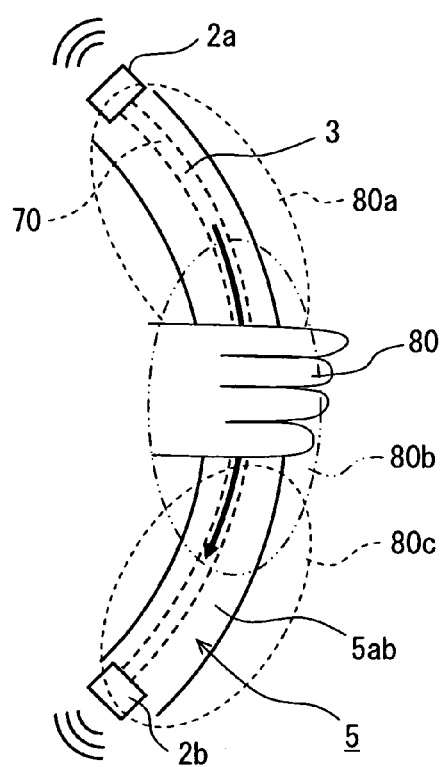
FIG. 3 is a diagram showing partially cross sectional view of the steering wheel for explaining perception situation of a traveling wave from a vibrator adjacent to a part of the steering wheel, at which the driver grips.
Figure 4:
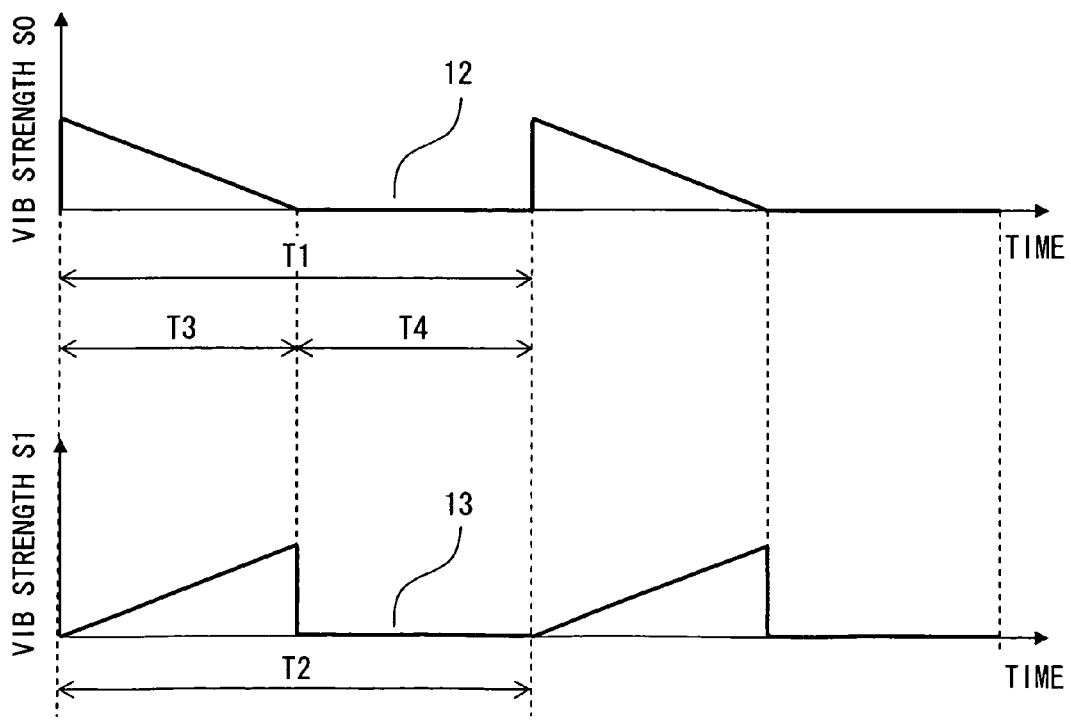
FIG. 4 is a graph showing time variation of vibration strength generated by the vibrator in the steering wheel.

FIG. 1 shows the information presentation device. FIG. 2 shows the steering wheel as the in-vehicle device. FIG. 3 explains a perception situation of the traveling wave from a vibrator adjacent to a part of the steering wheel, at which the driver grips. FIG. 4 shows time variation of vibration strength generated by the vibrator in the steering wheel.

The information presentation device 1 includes a stimulation element 2 mounted on a steering wheel 3, as shown in FIG. 2. The stimulation element 2 includes multiple vibrators 2a-2d. Further, the device 1 includes a contact portion detector 5 for detecting a part of the steering wheel 3, at which the driver grips.

The contact portion detector 5 may be a capacitive touch sensor for detecting a contact portion with capacitance change when a person contacts conductive resin material. The touch sensor is divided into two parts. Specifically, the detector 5 includes a first touch sensor 5ab and a second touch sensor 5cd so that the detector 5 detects the contact portion of the steering wheel, which is gripped by the driver. Alternatively, the detector 5 may include multiple parts equal to or more than three parts.

An enhancement device 7 for enhancing safety or comfort of the driver includes an air conditioner, a driving guidance device, a steering assist device, an operation assist device for acceleration, an operation assist device for brake, or an obstacle monitor around the vehicle. In the first embodiment, the enhancement device 7 is the steering assist device such as a traffic lane keep assist device for determining whether the vehicle runs on a traffic lane of a road properly. The traffic lane keep assist device is described in, for example, JP-A-2006-44563.

The traffic lane keep assist device mounted on a vehicle will be explained. The device includes an electric wave transmitting antenna, an electric wave receiving antenna and a traffic lane deviation determination element. The electric wave transmitting antenna transmits an electric wave toward an electric wave reflection member, which is arranged on a driving lane. The electric wave receiving antenna receives a reflected electric wave, which is reflected on the electric wave reflection member. The traffic lane deviation determination element determines based on the strength of the reflected electric wave whether the vehicle deviates from the driving lane, i.e., the traffic lane.

Further, a tire air pressure monitor is mounted on the vehicle. The monitor monitors the air pressure of the tire, which is mounted on a wheel of the vehicle, according to an electric wave signal. The monitor includes an air pressure sensor unit with a communication antenna and another communication antenna mounted on a body of the vehicle. The other communication antenna on the body receives the electric wave signal, which is transmitted from the communication antenna of the air pressure sensor unit. At least one of an electric wave transmitting antenna and an electric wave receiving antenna is mounted on the wheel. The communication antenna of the air pressure sensor unit provides the electric wave transmitting antenna and the electric wave receiving antenna.

The traffic lane keep assist device determines the deviation from the driving lane of the vehicle with using elements in the tire air pressure monitor. The electric wave reflection member is detected by the communication antenna in the air pressure sensor unit, which is disposed near the surface of the road. Thus, even when a weak detection electric wave is used for detection, the traffic lane keep assist device can determine the deviation from the lane with high detection accuracy.

If the driver decreases alertness, and the vehicle approaches a traffic lane line and/or a reflection member, a warning instruction is output. Further, when the vehicle is very close to the traffic lane line and/or the reflection member, the driving assist device outputs a steering assist instruction.

The directional information obtaining element 8 receives the steering assist instruction. The information presentation controller 9 transmits a driving signal to the stimulation element 2. Specifically, the controller 9 generates the driving signal having alternating voltage for driving the vibrator in order to prompt the driver to operate the steering wheel 3 to a proper direction. The steering wheel 3 provides a direction change operation unit.

Thus, based on the steering assist signal from the enhancement device 7 as the traffic lane keep assist device, the directional information obtaining element 8 detects a direction, to which the vehicle deviates from the proper direction. Specifically, the direction of deviation is right or left. Then, the element 8 outputs a signal of the direction of deviation to the information presentation controller 9.

The function and construction of the information presentation controller 9 will be explained. The steering wheel 3 in FIG. 2 is divided into a first wheel portion 301, a second wheel portion 302, a third wheel portion 303 and a fourth wheel portion 304 with four vibrators 2a, 2b, 2c, 2d.

Each vibrator 2a-2d contacts a center core 70, which provides a vibration transmission member of the steering wheel 3.

The function of the first embodiment will be explained. As shown in FIG. 3, when the driver grips the steering wheel 3 with fingers 80, the first touch sensor 5ab as the contact portion detector 5 detects a grip portion of the steering wheel 3. Then, a detection result is transmitted from the first touch sensor 5ab to the information presentation controller 9. The information presentation controller 9 becomes a standby mode for waiting the information from the directional information obtaining element 8. The directional information obtaining element 8 also becomes a standby mode for waiting information from the enhancement device 7. Thus, since the contact portion detector 5 is arranged at a part of the vehicle, which the driver of the vehicle touches, the information presentation controller 9 outputs the driving signal for generating the traveling wave when conditions for the driver to detect the traveling wave from the stimulation element 2 are met. Specifically, when the driver grips the steering wheel 3 at a predetermined position, the information presentation controller 9 outputs the driving signal. Thus, the traveling wave is not generated excessively, and the unnecessary traveling wave is not generated.

In the first embodiment, two touch sensors 5ab, 5cd are formed in the steering wheel 3. Alternatively, four touch sensors may be formed in the first to fourth wheel portions 301-304, respectively. In this case, when the touch sensors detects existence of a passenger, i.e., the driver, the information presentation controller 9, the directional information obtaining element 8 and the like become the standby mode immediately. Alternatively, when the four touch sensors detect which part of the steering wheel 3 the driver touches, the traveling wave corresponding to the part of the steering wheel 3 is generated.

When the directional information obtaining element 8 receives the driving support information having a directionality from the enhancement device 7, the directional information obtaining element 8 sends the stimulation information to the information presentation controller 9. The driving support information includes, for example, position information, traveling direction information and vehicle speed information. The stimulation information includes, for example, strength information, period information and operation timing information of the stimulation.

Based on the received stimulation information, the information presentation controller 9 controls at least one of the vibrators 2a-2d to perform operation of a vibration strength control pattern shown in FIG. 4. Specifically, the controller 9 controls a pair of the vibrators 2a-2d to execute the vibration strength control pattern. The vibrators 2a-2d are operated to provide false sense such as phantom sensation and apparent movement.

Here, the phantom sensation is different from the apparent movement. Specifically, the phantom sensation is phenomenon such that a person feels a single stimulation integrated and disposed at a middle of the two stimulations. Thus, the person does not feel two stimulations at two different positions when a distance and strength between two stimulations satisfy certain conditions.

In the first embodiment, as if the driver feels sensuously that the traveling wave moves from the vibrator 2a to the vibrator 2b, the vibration strength S0 of the first vibrator 2a is changed from zero to the maximum. The vibration strength S1 of the second vibrator 2b is also changed from zero to the maximum. The second vibrator 2b vibrates with a timing, which is equal to the timing of the first vibrator 2a.

As shown in FIG. 4, the vibration strength control pattern includes a no vibration period 12, 13. During the no vibration period 12, 13, the vibrator 2a-2d stops vibrating. After the no vibration period 12, 13, the vibrator 2a-2d repeats to vibrate. Thus, the first and second vibrators 2a, 2b are operated, so that the driver feels as if a vibration source is disposed at the grip portion of the steering wheel 3, and further, the vibration moves from the first vibrator 2a to the second vibrator 2b although the vibrator is not arranged at the grip portion.

Specifically, the driver, who grips the steering wheel 3 with the finger 80, feels that the vibration region moves from the upstream vibration region 80a to the downstream vibration region 80c via the middle vibration region 80b. Thus, the controller 9 prompts the driver to rotate the steering wheel 3 in a clockwise manner.

The vibrators 2a-2d are bridged with the center core 70 as the vibration transmission member. The driver perceives the traveling wave through the center core 70 and a surface skin on the center core 70. Thus, since the driver perceives the travel wave through the vibration transmission member between the vibrators 2a-2b, the number of vibrators 2a-2d is reduced although the driver does not contact, i.e., touch multiple vibrators directly, or the driver is not very close to the vibrators. Further, the vibrators are easily attached to the in-vehicle device such as the steering wheel 3.

Accordingly, when the above features are applied to the traffic lane keep assist device for providing the driving assist system, the driver intuitively recognizes the necessity of rotating the steering wheel 3 since the vehicle deviates from a proper traffic lane.

Thus, the vibration strength of the upstream side vibrator 2a is reduced with time, and the vibration strength of the downstream side vibrator 2b is increased with time. These operations of the vibrators 2a-2b are repeated. The upstream side vibrator 2a is disposed on an upstream side in the vibration transmission direction, and the downstream side vibrator 2b is disposed on a downstream side in the vibration transmission direction. Thus, the driver can perceive the traveling wave sufficiently.

Specifically, the reduction of the vibration strength of the upstream side vibrator 2a and the no vibration period are repeated, and the increase of, the vibration strength of the downstream side vibrator 2b and the no vibration period are repeated. The traveling wave is detected by the driver intermittently with a predetermined pause period, which is provided by the no vibration period. Thus, the driver easily perceives the traveling wave.

In FIG. 4, T3 represents a vibration period, and T4 represents the no vibration period. In this embodiment, a first period T1 of the first vibrator 2a is equal to the second period T2 of the second vibrator 2b. Thus, the no vibration period T4 of the first vibrator 2a is equal to the no vibration period T4 of the second vibrator 2b. The first vibrator does not vibrate in the no vibration period, and the second vibrator does not vibrate in the same no vibration period. Thus, when the driver recognizes the information, the driver obtains the information surely with concentrating the driving of the vehicle without switching a direction of eyes and without scattering attention caused by warning sound.

(Second Embodiment)

Figure 5:
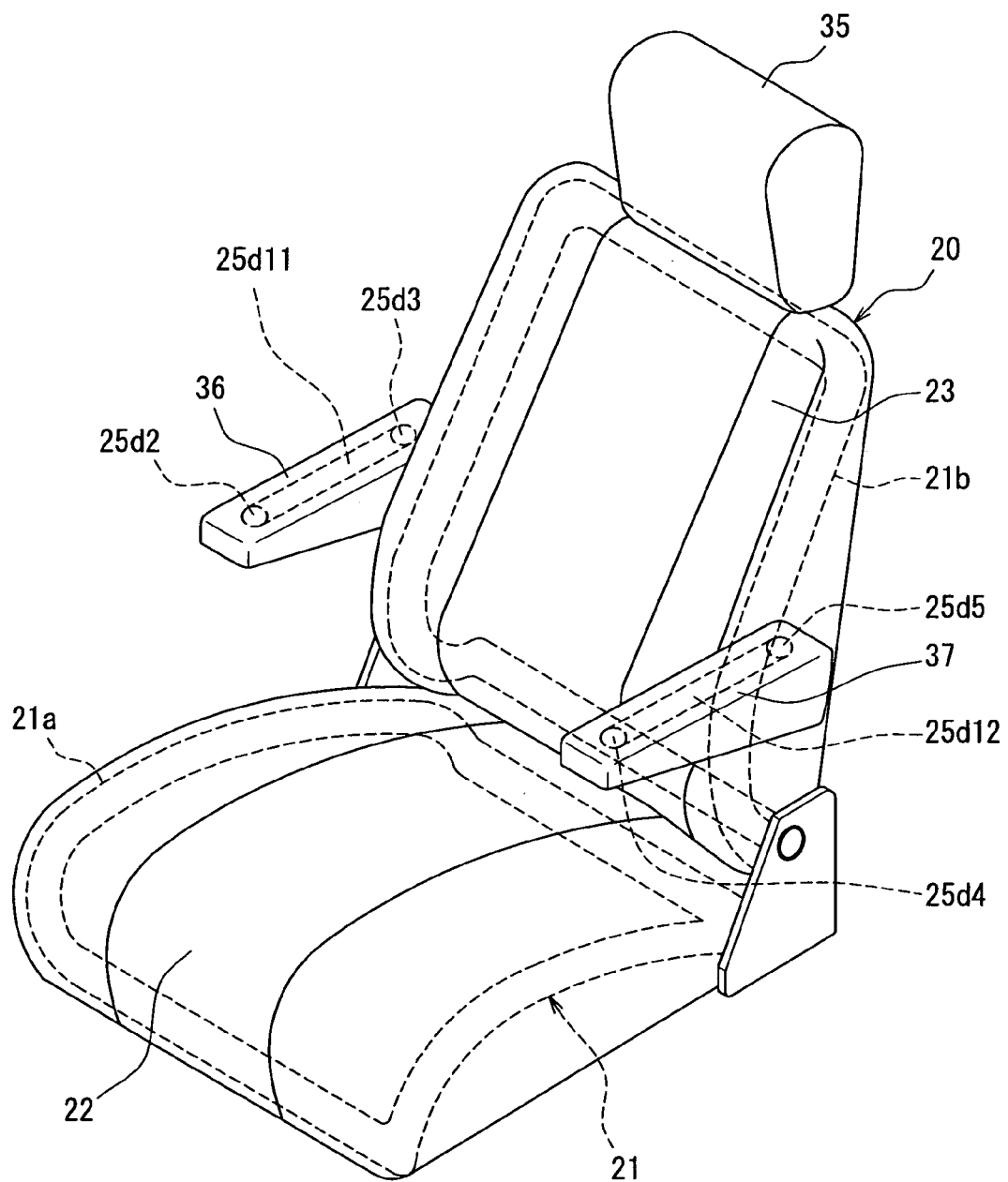
FIG. 5 is a diagram showing a seat as an in-vehicle device for a information presentation device according to a second embodiment.
Figure 6:
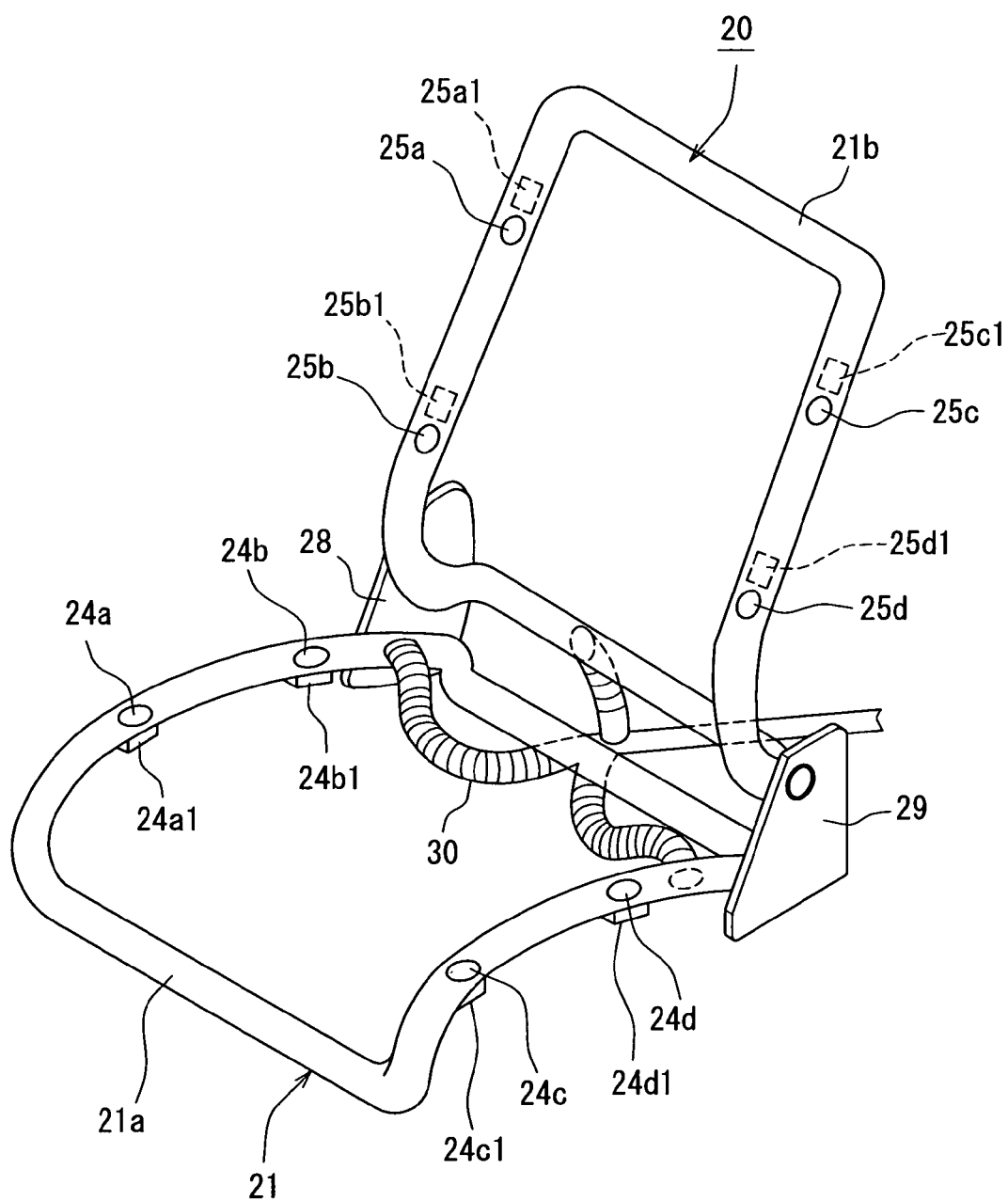
FIG. 6 is a diagram showing an exploded view of the seat including a seat frame in the seat, which provides a vibration transmission member and an air conditioning seat for flowing air.

A second embodiment will be explained. FIG. 5 shows a seat as an in-vehicle device. FIG. 6 shows a seat frame in the seat, which provides a vibration transmission member and an air conditioning seat for flowing air.

The seat 20, on which the driver sits down, is arranged on a floor of the vehicle via a base. The seat 20 includes a seat frame 21, a pair of three dimensional surface skins 22, 23, and air blowing openings 24a-24d, 25a-25d.

The seat frame 21 providing a framework of the seat 20 includes a seat rim 21a, a backrest rim 21b, and a pair of support members 28, 29. The seat rim 21a is attached to the base. The backrest rim 21b is arranged on a back side of the seat rim 21a. The support members 28, 29 support the backrest rim 21b on the seat rim 21a such that the backrest rim 21b tilts with respect to the seat rim 21a.

The inside of the seat rim 21a provides a passage, through which the air flows. The seat rim 21a provides a square rim, which is prepared by bending a circular pipe. The inside of the backrest rim 21b also provides a passage, through which the air flows. The backrest rim 21b provides a square rim, which is prepared by bending a circular pipe.

The three-dimensional surface skins 22, 23 are made of polyester fiber and the polyester fiber is woven so as to form the skins 22, 23. Specifically, each three-dimensional surface skin 22, 23 has a torus structure, which is prepared by weaving three-dimensionally multiple piles. A surface mesh layer, a backside mesh layer and middle mesh layers are connected to each other by a predetermined distance so that multiple piles are formed.

Reference numeral 30 in FIG. 6 represents a supply pipe 30 for the seat having bellows. The pipe 30 connects between an air conditioning unit (not shown) and the seat rim 21a. The pipe 30 extends from the air conditioning unit, and is branched to a right supply pipe 30 and a left supply pipe 30. The right supply pipe 30 is connected to a right rim of the seat rim 21a, and the left supply pipe 30 is connected to a left rim of the seat rim 21a. The air conditioning unit includes a seat air conditioning body for cooling the air or heating the air with using a Peltier element.

The seat rim 21a includes multiple air blowing openings 24a-24d, and the backrest rim 21b includes multiple air blowing openings 25a-25d. Each opening 24a-24d, 25a-25d has an oval shape or an ellipsoid shape. The air flowing through the air flowing passages of the seat rim 21a and the backrest rim 21b is blown via the openings 24a-24d, 25a-25d toward a hip or thighs of the driver through the three-dimensional surface skins 22, 23, respectively.

As shown in FIG. 5, reference numeral 35 represents a head rest 35, which is attached to an upper portion of the backrest rim 21*b*. Reference numerals 36, 37 represent arm rests 36, 37, which are attached on the right and left sides of the backrest rim 21*b*.

Multiple vibrators 24*a*1-24*d*1, 25*a*1-25*d*1 are embedded in the seat 20. The vibrators 24*a*1-24*d*1, 25*a*1-25*d*1 are separated from each other. Each vibrator 24*a*1-24*d*1, 25*a*1-25*d*1 contacts the seat frame 21. Each vibrator 24*a*1-24*d*1, 25*a*1-25*d*1 is disposed near the opening 24*a*-24*d*, 25*a*-25*d***.

The vibrators 24*a*1-24*d*1, 25*a*1-25*d*1 are bridged with the seat frame 21 as a vibration transmit layer. The traveling wave proceeds toward a predetermined direction between the vibrators 24*a*1-24*d*1, 25*a*1-25*d*1. The driver perceives the traveling wave between the vibrators 24*a*1-24*d*1, 25*a*1-25*d*1, so that the driver receives the information having directionality.

Other vibrators 25*d*2-25*d*5 are arranged on the arm rests 36, 37. The driver sitting on the seat 20 perceives the information having directionality with using the vibrators 25*d*2-25*d*4.

The vibrators 25*d*2-25*d*4 arranged on the arm rests 36, 37 are bridged with a right vibration transmit member 25*d*11 and a left vibration transmit member 25*d*12. The right and left vibration transmit members 25*d*11-25*d*12 are made of a metal plate or hard resin material, and disposed in the arm rests 36, 37. the driver perceives the traveling wave through at least the right and left vibration transmit members 25*d*11-25*d*12 and a surface skin of the seat 20. Thus, since the driver perceives the traveling wave through the right and left vibration transmit members 25*d*11-25*d*12, the driver can perceive the wave without contacting the vibrators 25*d*2-25*d*5 directly. Thus, the number .of vibrators is reduced. Further, the vibrators are easily attached to the in-vehicle device such as the seat 20.

(Other Embodiments)

In the first embodiment, the enhancement device 7 is a traffic lane keep assist device (i.e., traffic lane deviation warning system). Alternatively, the enhancement device 7 may be a driving support system for coordinating with infrastructure. The driving support system is a driving support system communicating between vehicles, a driving support system communicating between a vehicle and a road side element, or a driving support system communicating between a vehicle and a pedestrian.

Specifically, the wireless communication construction of the vehicle includes communication between a vehicle and a road side element or communication between a vehicle and another vehicle. In the communication between a vehicle and a road side element, the vehicle communicates with the road side element. In the communication between a vehicle and another vehicle, the vehicle communicates with the other vehicle. Further, the vehicle may communicate with the other vehicle via the road side element so that communication between vehicles via the road side element.

For example, when a front vehicle disposed in a traffic jam behind a curve in the road transmits information about the jam to a rear vehicle so that the rear vehicle is protected from colliding with a vehicle in front of the rear vehicle, a method for communicating between a vehicle and a road side element may be used. In the method, a camera is arranged at the curve of the road, and the camera detects a vehicle. When the traffic jam is caused, the road side element transmits the information about the traffic jam to the front vehicle and the like just before the curve of the road.

The above method may be performed by a method for communicating between a vehicle and another vehicle, or a method for communication between a vehicle and another vehicle via a roadside element. In the method for communicating between the vehicle' and the other vehicle via the roadside element, the vehicle disposed in the traffic jam transmits information about a situation around the vehicle to the roadside element, which is disposed near the vehicle. Then, another roadside element disposed before the curve of the road transmits the information of the traffic jam to the other vehicle, which is disposed on a rear side of the vehicle. In the method for communicating between the vehicle and the other vehicle, the vehicle in the traffic jam transmits the information about the traffic jam to the other vehicle directly.

A method for communicating between the vehicle and a pedestrian may be performed. The method for communicating between the vehicle and the pedestrian may be performed by a similar way to the method for communicating between a vehicle and another vehicle, and a method for communication between a vehicle and another vehicle via a roadside element. The present embodiment may be applied to prompt a speed reduction operation, an acceleration operation, a right-left turn operation, a rear caution, a front caution and a right-left side caution with using the above communication methods. Thus, the driver perceives intuitively necessity for rotating the steering wheel, existence of a dangerous vehicle arranged in a blind area.

When another vehicle approaches from a front right side of the vehicle, the vibration of the traveling wave may be generated from the upper side to the lower side in the right part of the steering wheel so that the driver perceives the other vehicle. Thus, the traveling wave prompts the driver to perceive the warning information, which represents directionality.

In the above embodiments, the steering wheel and the arm rest provide the medium for conducting the information. Alternatively, other parts such as a floor mat, which contacts a body of the driver, may provide a medium for conducting the information.

The information from the enhancement device 7 may not relate to safety. For example, the information may relate to the increase of comfort or the increase of display effect. For example, when the seat air conditioning system is functioned, and cooling air blows from the seat, the traveling wave moves from a center of a lower back to a foot of the driver, and further, moves from the center of a back to a head of the driver so that the driver feels that heat is discharged from the body of the driver to the outside. When hot air blows from the seat, the traveling wave moves from the foot to the lower back, and moves from the head to the back of the driver so that the driver feels that heat is charged from the outside to the body of the driver. Thus, the driver can recognize the energy flow.

In a case where the vehicle is a hybrid vehicle, a regenerative brake system functions when the driver puts on the brake. This energy regeneration, i.e., energy accumulation may be perceived by the driver such that the traveling wave moves from the foot to the center of the lower back, and further, moves from the head to the back of the driver.

The vibrator may be a piezoelectric vibrator, a capacitive vibrator, an electromagnetic vibrator or the like. The vibrator provides a vibration generation device. Alternatively, the vibrator may be a vibration motor. In this case, a direct current voltage is applied to be higher so that the number of rotations increases, and therefore, the vibration strength increases. Further, in some cases, a driving current of a motor may increase so that a driving torque increases. Alternatively, a frequency may be changed to increase the driving torque. Further, the frequency and the voltage may be changed to increase the driving torque.

In the above embodiments, the capacitive touch sensor detects the contact of the user. Alternatively, a pressure sensitive touch sensor, a light sensor or an infrared sensor may be used for detecting the contact of the user. The pressure sensitive touch sensor functions a switch based on a mechanical displacement. The infrared sensor detects an infrared light emitted from a body of a person. Further, without a human body detector such as the touch sensor, when the information having directionality is input, the vibration may be generated regardless of the contact of the user.

If possible, multiple vibrators may be attached to the medium for conducting the information. However, when the number of vibrators is large, a manufacturing cost increases. When the number of vibrators is small, a distance between adjacent vibrators is comparatively large. If the distance between vibrators is very large, the driver cannot detect the traveling wave. Thus, it is necessary to set the distance to be in a predetermined range so that the traveling wave is generated between the vibrators, and the driver can perceive the traveling wave. The traveling wave is not a stationary wave having a fixed node position. Thus, the driver can detect not only existence of the vibration but also a direction of the vibration. Accordingly, in view of these functions of the vibrators, a rated output power of each vibrator and the number of vibrators are determined.

When the vibrator is a vibration generator such as a piezoelectric vibrator, a capacitive vibrator and an electromagnetic vibrator, an effective value of an alternating voltage to be applied to the vibrator may be changed with time. Specifically, the effective value may be increased and decreased with time. As a result, the waveform of the vibration strength may be different from a saw tooth waveform, which is shown in FIG. 4. In FIG. 4, the vibration strength has a slanting shape so that the strength increases or decreases continuously. Thus, the waveform of the vibration strength may be a curved slope shape so that the strength increases or decreases continuously. Alternatively, the waveform of the vibration strength may be a step like shape so that the vibration strength increases and decreases in a step manner. Thus, the timing of vibration and/or the change of vibration strength of each vibrator are changed so that the traveling wave is generated from the vibrators. Thus, the user can perceive the traveling wave, i.e., the displacement of the vibration position among the vibrators.

The waveform of the vibration strength may be different from a rectangular triangle shown in FIG. 4. Alternatively, the waveform may be other triangles, a trapezoid, a sine wave or a half of sine wave. In the above embodiments, the vibration start timings of vibrators are synchronized with each other. Alternatively, the vibration start timing of one vibrator may be shifted from the vibration start timing of adjacent vibrator.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An information presentation device comprising:
a directional information obtaining element for obtaining directional information based on a signal from an enhancement device, wherein the enhancement device enhances safety or comfort of a passenger of a vehicle, and at least a part of the enhancement device is disposed in the vehicle;
an information presentation controller for generating a driving signal based on the directional information;
a stimulation element including a plurality of vibrators, each of which is operated based on the driving signal so that the vibrator generates a traveling wave of vibration in an in-vehicle element, wherein the passenger touches the in-vehicle element; and
a touch detector disposed in the in-vehicle element, wherein
a directionality of the traveling wave corresponds to the directional information, the stimulation element transmits the traveling wave to the passenger so that the passenger perceives the directionality of the traveling wave,
the information presentation controller outputs the driving signal when the touch detector detects that the passenger is capable of perceiving the traveling wave,
the stimulation element is disposed in the in-vehicle element,
the in-vehicle element is a direction change operation unit for operating a driving direction of the vehicle,
the plurality of vibrators is separated from each other by a predetermined distance, and the plurality of vibrators is coupled with each other via a vibration transmit member so that the passenger perceives the traveling wave through the vibration transmit member, and
the vibration transmit member is made of a metal or hard resin material that bridges between the vibrators which are separated and spaced apart, the vibration transmit member being configured to transmit the traveling wave as vibration between the vibrators.

2. The information presentation device according to claim 1,
wherein the information presentation controller outputs the driving signal when the touch detector detects that the passenger touches the in-vehicle element.

3. The information presentation device according to claim 1,
wherein the in-vehicle element is a steering wheel.

4. The information presentation device according to claim 1,
wherein the stimulation element is disposed in the in-vehicle element,
wherein the in-vehicle element is a part of a seat, on which the passenger sits down.

5. The information presentation device according to claim 1,
wherein the plurality of vibrators includes an upstream vibrator and a downstream vibrator,
wherein the upstream vibrator is disposed on an upstream side of a vibration transmit direction of the traveling wave, and the downstream vibrator is disposed on a downstream side of the vibration transmit direction,
wherein the upstream vibrator has a vibration strength, which is repeatedly changed with time in a first change pattern,
wherein the downstream vibrator has a vibration strength, which is repeatedly changed with time in a second change pattern, and
wherein the first change pattern is different from the second change pattern so that the traveling wave moves from the upstream vibrator to the downstream vibrator.

6. The information presentation device according to claim 5,
wherein the vibration transmit direction of the traveling wave is a direction from the upstream vibrator to the downstream vibrator.

7. The information presentation device according to claim 5, wherein the first change pattern provides that the vibration strength is repeatedly reduced with time, and the second change pattern provides that the vibration strength is repeatedly increased with time.

8. The information presentation device according to claim 5,
wherein repetition of the vibration strength of the upstream vibrator includes a no vibration period, in which the upstream vibrator does not vibrate, and
wherein repetition of the vibration strength of the downstream vibrator includes a no vibration period, in which the downstream vibrator does not vibrate.

9. The information presentation device according to claim 1,
wherein the enhancement device is an air conditioning system, a driving guidance device, a steering assist device, an operation assist device for acceleration, an operation assist device for brake, or an obstacle monitor around the vehicle.

10. The information presentation device according to claim 1,
wherein the enhancement device is a steering assist device,
wherein the stimulation element is disposed in the in-vehicle element,
wherein the in-vehicle element is a steering wheel of the vehicle,
wherein the directional information provides an instruction of a turning direction of the steering wheel, and
wherein the stimulation element prompt the passenger to operate the steering wheel along with the turning direction.

11. The information presentation device according to claim 10,
wherein the plurality of vibrators includes an upstream vibrator and a downstream vibrator,
wherein the upstream vibrator is disposed on an upstream side of a vibration transmit direction of the traveling wave, and the downstream vibrator is disposed on a downstream side of the vibration transmit direction,
wherein the upstream vibrator has a vibration strength, which is repeatedly changed with time in a first change pattern,
wherein the downstream vibrator has a vibration strength, which is repeatedly changed with time in a second change pattern,
wherein the first change pattern is different from the second change pattern so that the traveling wave moves from the upstream vibrator to the downstream vibrator, and
wherein the vibration transmit direction of the traveling wave is a direction from the upstream vibrator to the downstream vibrator, which corresponds to the turning direction of the steering wheel.

12. The information presentation device according to claim 11,
wherein vibration of the plurality of vibrators provides phantom sensation or apparent movement.

13. The information presentation device according to claim 1, the vibration transmit member being configured to receive and transmit the traveling wave as vibration between the vibrators.

* * * * *